United States Patent [19]  [11] Patent Number: 4,900,189
Barosso et al.  [45] Date of Patent: Feb. 13, 1990

[54] IRRIGATION DEVICE AND FACILITIES FOR THE PULSED DELIVERY OF AN IRRIGATION LIQUID

[75] Inventors: Emilio Barosso, Santa Maria Maddalena; Aldino Rivi, Ferrara, both of Italy

[73] Assignee: Enichem Agricoltura S.p.A., Palermo, Italy

[21] Appl. No.: 372,213

[22] Filed: Jun. 22, 1989

Related U.S. Application Data

[63] Continuation of Ser. No. 258,218, Oct. 14, 1988, abandoned.

[30] Foreign Application Priority Data

Oct. 29, 1987 [IT] Italy ............................... 22449 A/87

[51] Int. Cl.⁴ ............................................. B05B 15/00
[52] U.S. Cl. ........................................ 405/39; 405/36; 239/101; 239/576; 137/624.14
[58] Field of Search ................... 405/37, 39, 40, 41; 137/624.14, 486; 239/99, 101, 570, 572, 576

[56] References Cited

U.S. PATENT DOCUMENTS 1,685,205  9/1928  Stein ..................................... 137/486
3,053,461  9/1962  Inglis ..................................... 239/99 X
3,739,952  6/1973  Chafitz et al. ..................... 239/576 X
4,176,791  12/1979  Cattaneo et al. .................. 239/99 X

FOREIGN PATENT DOCUMENTS 496022  3/1976  U.S.S.R. ............................. 137/486

Primary Examiner—Randolph A. Reese
Assistant Examiner—Arlen L. Olsen
Attorney, Agent, or Firm—Hedman, Gibson, Costigan & Hoare

[57] ABSTRACT

A device for the automatic and pulsed delivery of an irrigation liquid, which can be connected, at its upstream side, to a source liquid under a constant or substantially constant pressure, and at its downstream side, to a distribution network equipped with pressure-responding valves. These valves are capable of closing, during the step charging of the distribution system, at a pressure equal to, or substantially equal to, the liquid feed pressure, and of opening, during irrigation liquid expelling, when the pressure decreases under said value. The device comprises a Venturi device, fed with the same irrigation liquid, from whose region of constricted stream a duct is branched off, to transmit to a sliding member depressure generated by the Venturi. As a function of such a depressure, a sliding member reciprocatingly shifts between a position of opening of the irrigation liquid delivery port, and a position of closure of said port and of simultaneous or subsequent venting towards the atmosphere, so as to cause a pressure drop and the explusion of the irrgation liquid from the distribution network, and the beginning again of the cycle. An irrigation facility incorporating this device is connected to a distribution network equipped with a plurality of pressure-responding valves, each one of which is provided with a delivery nozzle.

7 Claims, 4 Drawing Sheets

IRRIGATION DEVICE AND FACILITIES FOR THE PULSED DELIVERY OF AN IRRIGATION LIQUID

This application is a continuation of Ser. No. 07/258,218, filed 10/14/88, now abandoned.

The present invention relates to a device for the pulsed delivery of an irrigation liquid, and to the irrigation facilities incorporating such a device.

In agriculture, open-loop systems for localized irrigation are used, which comprise a duct directly connected with a feeding source (a hydraulic pump, a water network under pressure, and so forth), from which at more or less regular intervals hoses and secondary ducts of smaller size branch off, which perform the task of dispersing the liquid into the ground. These secondary ducts or hoses have in their turn variable structures, in order to distribute the liquid as evenly as possible even in the farthest points from the source; all of them are provided with pressure reducing means, in order that the liquid may exit them in small amounts (drops). On this subject, reference is made to the specification of U.K. patents 1,286,538 and 1,484,588, and of U.S. Pat. Nos. 3,698,195 and 4,009,832.

However, with these open-loop systems, a uniform irrigation in all the points of the ground is difficult to achieve.

U.S. Pat. No. 4,176,791 discloses an irrigation facility comprising a pilot valve, connected to an upstream source of pressurized liquid, from which a sequence of duct lengths branch off, which are connected in series by means of secondary valve, each one of which is provided with a spraying nozzle. The sequence of duct lengths branch off from the pilot valve, and form a closed loop returning to the same valve.

Such an irrigation system, improves the evenness of distribution of the liquid into the ground as compared to the open-loop systems, is affected by the complexity deriving from the adoption of a double pipe, i.e., an outward pipe from, and a return pipe back to, the pilot valve. Furthermore, in a closed-loop system, it is difficult to vent the air which accumulates inside the same system, and endangers the correct operation of the valves.

The purpose of the present invention is to overcome the drawbacks affecting the prior art, by means of a device for the automatic and pulsed delivery of an irrigation liquid, which can be applied to an open-loop irrigation system, and is capable of making it possible the liquid to be uniformly distributed at any distances from the source thereof.

More particularly, the device according to the present invention is a device for the automatic and pulsed delivery of an irrigation liquid, which can be connected, at its upstream side, to a source of the liquid under a constant or substantially constant pressure, and at its downstream side, to an open-loop distribution network equipped with secondary pressure-responding valves, which are capable of closing, during the step of charging of the distribution network, at a pressure equal to, or substantially equal to, the feed pressure, and of opening, during the step of irrigation liquid expelling, when the pressure decreases under said value; said device being characterized in that it comprises:

a Venturi device, fed by the same irrigation liquid, from whose region of constricted stream a duct is branched off, in order to transmit to a sliding member the depressure generated by the Venturi device, and a piston-like sliding member offering a first face thereof to the pressure of delivery of the irrigation liquid, and a second face thereof, parallel to, or substantially parallel to, said first face, to the depressure generated by the Venturi device; with the end stroke positions which said sliding member can move to alternatively determining:

the opening of the port of feeding of the liquid from the source, and the simultaneous closure of the vent to the atmosphere, as a consequence of the effect of the depressure generated by the Venturi device during the system charging step; and the closure of said port as a consequence of the pressure generated by the ending of the Venturi effect at the end of the system charging step, and the simultaneous or subsequent opening of the vent towards the atmosphere, with the consequent decrease in pressure, expulsion of the liquid from the system, and beginning again of the cycle.

Therefore, the pulsed (or intermittent) irrigation device according to the present invention is essentially a pressure pulse, and consequently intermittent flowrate, generated device, which is connected to an upstream supply source which feeds the system with water, or another irrigation liquid, under pressure, and with a constant, or essentially constant, pressure value; and with a downstream distribution network equipped with secondary valves which open when the pressure decreases, e.g., to the atmospheric value, and close when the pressure inside the network increases up to the feed value, with the delivery energy being stored by the elastic deformation of the same network, submitted to a pulsing pressure.

According to a form of practical embodiment, the device according to the present invention is constituted by a valve body inside which provided are:

a primary circuit of the liquid, positioned in the bottom portion of the valve body, and consisting of an inlet duct and an outlet duct, with a port, which can be closed, being interposed between them, and with a Venturi device being provided downstream the outlet duct;

a vent hole towards the atmosphere, positioned in the upper portion of the valve body;

a secondary circuit of the liquid, which connects the region of constricted stream of the Venturi device to the vent hole through an intermediate chamber;

a piston-like sliding member controlled by said secondary circuit, reciprocatingly movable between an upper position of closure of the vent hole and opening of the port of the main circuit, and a lower position of opening of said vent hole and closure of said port of said main circuit.

According to a particular form of practical embodiment, an elastic membrane is interposed between the sliding member and the port through which the liquid is fed from the source.

According to another particular form of practical embodiment, an elastic membrane is interposed between the sliding member and the vent to atmosphere port.

According to a further particular form of practical embodiment, the sliding member is peripherally connected to the valve body by means of an elastic membrane, and such a membrane constitutes that face of the sliding member, to which the depressure generated by the Venturi device is transmitted.

The invention is now illustrated by referring to the hetero attached drawing tables, wherein.

Figure 1:
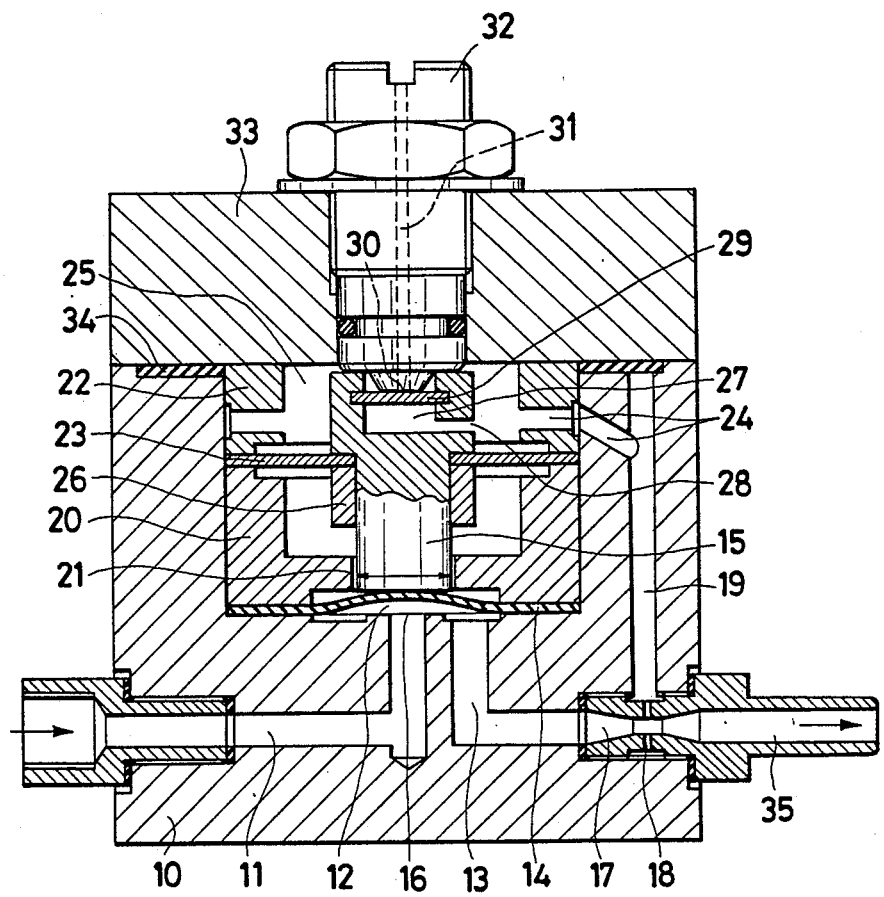
FIG. 1 shows a vertical sectional view of a form of practical embodiment of the device for the automatic and pulsed delivery of an irrigation liquid.

Referring to FIG. 1, the device for the automatic and pulsed delivery comprises a valve body 10, in whose bottom portion the inlet duct 11 for the irrigation liquid is provided, which inlet duct leads to the chamber 12, with this latter being connected, in its turn, with the outlet duct 13. The inlet duct 11 is fed by a source (not shown in the figures) of the irrigation liquid, which delivers the liquid under pressure, and at constant, or substantially constant, values of pressure. Inside the chamber 12, a tight sealing membrane 14, driven by the piston member 15, sliding in a vertical direction, opens or closes the passage between the ducts 11 and 13, according to whether the piston 15 is in a lifted or lowered position, allowing the membrane 14 to move away from, or, respectively, compressing said membrane 14 towards, the seat 16. The outlet duct 13 is connected to a Venturi device 17, on the region of constricted stream of which a plurality of radial bores 18 are provided, which are connected to the upper portion of the valve body 10 by means of the duct 19. In the middle region of the valve body 10 a cylindrical lining 20 integral with the same valve body is provided. Said cylindrical lining 20 keeps with its lower portion the membrane 14 in the position assigned to it, keeping the perimetrical annulus region thereof constrained against the valve body 10. In the bottom region of the cylindrical lining 20 a cylindrical circular bore 21 is provided, the inner diameter "a" of which is coherent with the piston 15, guiding it and enabling it to reciprocate in the vertical direction. Above the lining 20 a second lining 22 is provided, which has transversal dimensions substantially equalling the first lining 20. Between the two linings 20 and 22, an elastic, annulus-shaped membrane 23 is positioned, the external peripheral portion of which is constrained between the linings 20 and 22, whilst its inner peripheral portion is constrained to the piston 15. It therefore results evident that a displacement of the piston 15 in the axial direction relatively to the lining 20 causes a change in the configuration of the membrane 23 on the plane of the figure.

In the upper lining 22, a channel 24 is provided, which puts the chamber 25, comprised between the piston 15 and the lining 22, in communication with the duct 19. The surface area (S23) offered by the membrane 23 to the pressure existing inside the chamber 25 is larger than the surface area (S14) offered by the membrane 14 to the pressure existing inside the chamber 12.

The upper portion of the piston 15 has a cup-shaped configuration, the hollow 27 of which is in communication with the chamber 25 by means of the duct 28. In the middle region of the cup, a circular elastic membrane 29 is provided, which closes the port 30 of the vent 31 towards the atmosphere, provided in the adjustment screw 32, passing through the cover 33 of the valve body 10. Downstream the Venturi device 17, the automatic and pulsed delivery device is connected to the distribution system (not shown) through the duct 35.

When operating, the device of FIG. 1 is filled with liquid. In the configuration shown in FIG. 1, in which the membrane 14 is lifted, the liquid flows along the main circuit from 11 to 35, running through the Venturi tube 17, generating in the constricted-stream region 18 a relative depressure, which is transmitted to the chamber 25.

Neglecting the effect of the weight of the piston 15 and of the elasticity of the membranes, such conditions are maintained until:

$$P25.S23 \text{ smaller than } P12.S14 \qquad (I)$$

wherein:
P25 and P12 indicate the pressures respectively existing inside the chamber 25 and 12; and
S23 and S14 respectively indicate the surface areas of the membranes 23 and 14 offered to the respective pressures.

Under these conditions, a liquid stream flows along the main circuit, and the distribution network downstream the duct 35 receives such a liquid stream within the limits of its elasticity, and expands, getting deformed, and storing elastic energy. With increasing deformation of said downstream system, the resistance against the reception of further liquid increases, and a back-pressure is generated, which increases until the pressures existing inside the ducts 11 and 35 tend to balance, and therefore the flowrate through the Venturi tube 17 decreases, and the valve of the pressure generated inside the constricted stream region decreases as well.

As a consequence, the pressure inside the chamber 25 increases, until the condition occurs:

$$P25.S23 \text{ larger than } P12.S14 \qquad (II)$$

wherein P12, P25, S14 and S23 have the same meaning as above reported.

Under these conditions, the force P25.S23 has such a value as to deform the membrane 23, and push downwards the piston 15. During its downward stroke, the piston 15 compresses the membrane 14 against the seat 16, and stops the liquid flow through the Venturi tube 17. The downwards motion of the piston 15 also lowers the elastic membrane 29 which, counteracted in its moving away from the seat of the port 30 by the back-pressure existing inside the chamber 27, relatively to the atmospheric pressure existing inside the vent channel 31, starts deformating according to a spherical deformation pattern, progressively reducing its surface area of contact with the seat of the port 30, until the elastic force exerted by the membrane no longer balances such a back-pressure, and opens the vent channel 31 towards the atmosphere.

Such an equilibrium point is easily adjustable by means of the screw 32, which determines the amplitude of the elastic stroke which the membrane 29 should move by before detaching, and allowing the liquid to flow in through the port 30 and the vent 31.

The volume of liquid discharged through 32 is in any case small, in that it is equivalent to the volume generated by the downwards deformation of the membrane 23, before the membrane 29 opens the port 30.

As soon as the vent in 30 and 31 is open, a violent pressure drop occurs in chamber 27 and 25, as well as inside the ducts 24, 19 and 35, which causes the liquid to be expelled by the secondary valves installed in the distribution network downstream the duct 35.

Such a pressure drop causes the condition to occur:

$$P25.S23 = P_{atm}.S23 \text{ smaller than } P2.S14$$

and therefore the force prevails, which is exerted by the liquid inside the main circuit on the membrane 14; the piston 15 returns upwards and closes the port 30 through the membrane 29.

The device of FIG. 1 can therefore start again a new cycle of pressure modulation.

It is evident that, inasmuch as the network downstream the duct 35 is always full of liquid, the volume delivered by the secondary valves of the distribution system equals the volume generated by the elastic expansion of the same network, which, at each delivery, returns back to its resting conditions.

The present invention, according to another aspect thereof, relates to the irrigation facilities which incorporate the device for the automatic and pulsed delivery of the irrigation liquid.

In such facilities, said device is connected to an end of the distribution network, bearing a plurality of pressure-responding valves equipped with a delivery nozzle.

Figure 2:
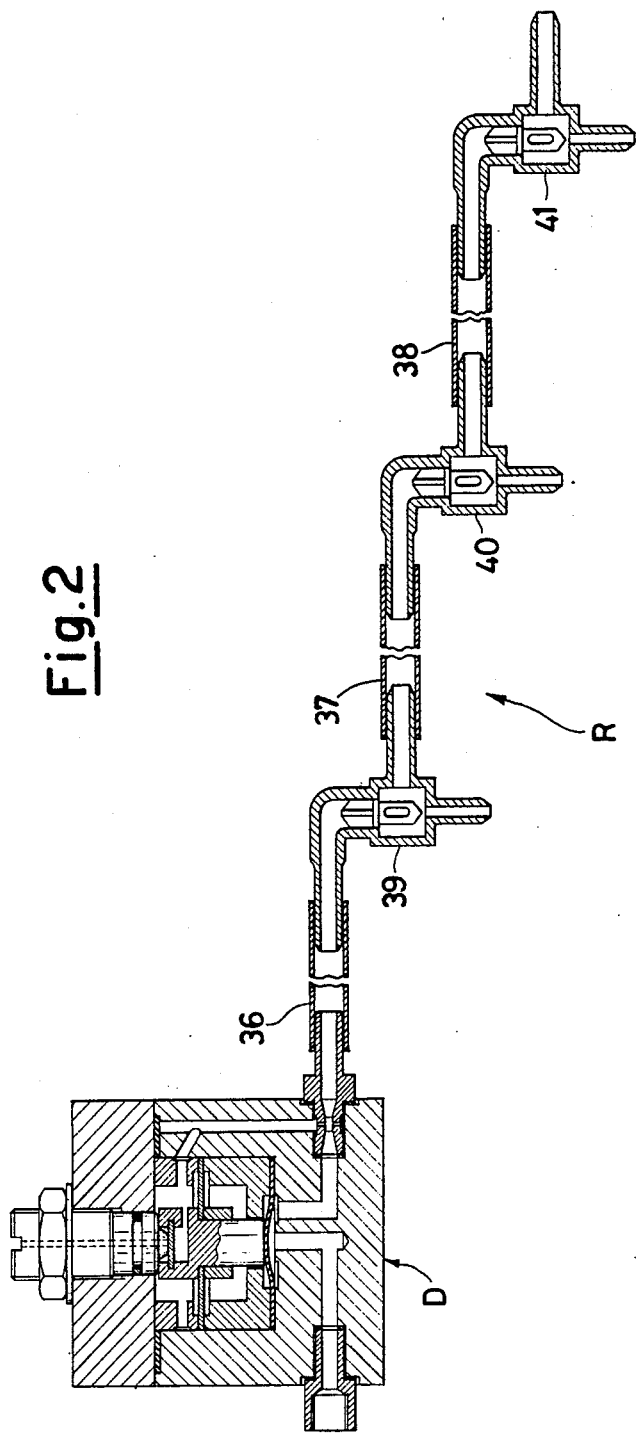
FIG. 2 shows a vertical sectional view of an irrigation facility, wherein the device of FIG. 1 is connected to a liquid distribution network, equipped with secondary, pressure-responding valves.

In particular, referring to FIG. 2, by the character D the device for the automatic and pulsed delivery of the irrigation liquid, and by the character R the distribution network for such a liquid are generally indicated. This distribution network is constituted by a sequence of duct portions, each one of which is provided at its downstream end with a secondary valve equipped with a delivery nozzle. In FIG. 2, for the sake of simplicity, only three of these duct portions are shown and are indicated by the reference numerals 36, 37 and 38; the relevant valves are respectively indicated by the reference numerals 39, 40 and 41.

Figure 3:
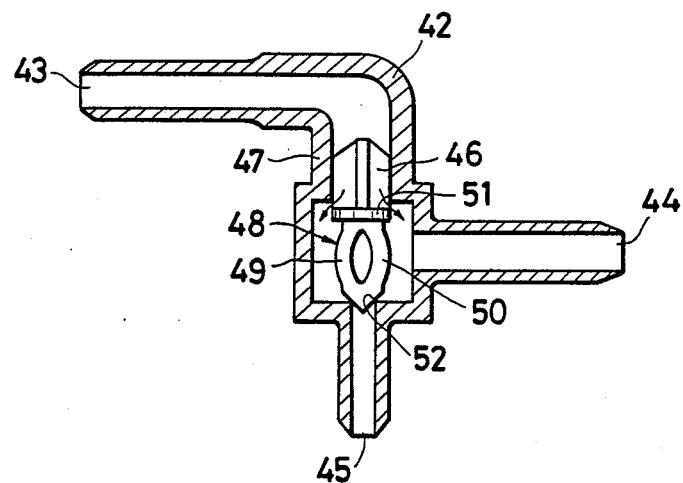
FIG. 3 shows a vertical sectional view of particular forms of embodiment of the secondary valves, which can be used in the distribution network of the irrigation facility of FIG. 2.
Figure 4:
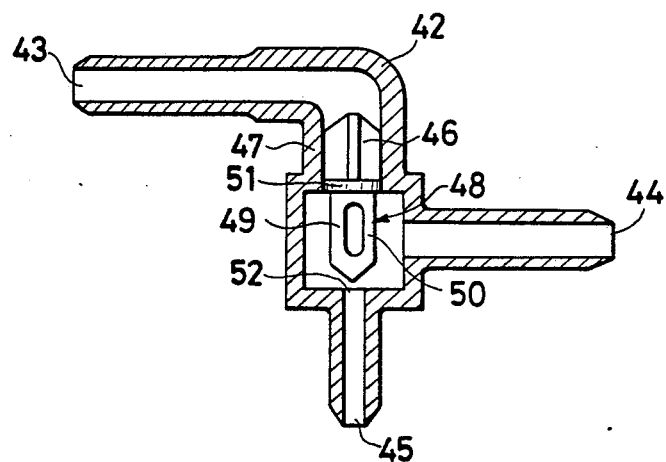
FIG. 4 shows a vertical sectional view of another particular form of embodiment of the secondary valves, which can be used in the distribution network of the irrigation facility of FIG. 2.

According to a preferred form of practical embodiment, the secondary valves connected to the distribution system have the configuration shown in FIGS. 3 and 4. In particular, in these figures, one can see that the valve consists of a body 42, which comprises the inlet channel 43, the outlet channel 44 and the delivery bore or nozzle 45. Inside said valve a piston 46 is installed, which is provided with a tight sealing disk 51, to which the shutter 48 is connected. This latter is constituted by two flexible cylindrical members 49 and 50 made from a flexible plastic material and, when the piston 46 slides inside its cylindrical guide 47, it alternatively shuts, according to the pressure existing inside the channels 43 and 44, the seat 52 provided on the delivery nozzle 45, and the inlet channel 43.

During the charging step, the above-disclosed pulsing device fills the distribution network until the pressure inside the same network reaches a value equal to, or close to, the source pressure value.

In particular, referring to FIGS. 2, 3 and 4, during the charging step, the liquid, under the effect of the pressure of the source, flows through the pulsing distributor device D and the portion 36 of the network R, reaching the secondary valve 39. In this valve, the liquid applies a pressure to the piston 46, and this latter in its turn applies a thrust to the shutter 48, pushing it against the seat 52, closing it. The liquid delivery pressure causes also the tight sealing disk 51 to sink, with such an acting being made easier by the flexibility of the cylindrical members 49 and 50 of the shutter 48, made from a flexible plastic material.

The lowering of the tight sealing disk 51 opens a passage port between the inlet channel 43 and the outlet channel 44, thus making it possible the portion 37 of the distribution network R to be filled, and enabling the liquid to reach the valve 40; and so on, until the network is completely filled.

When the filling of the network is ended, the flow of the liquid stream stops and, with the Venturi effect in the device D consequently ending, the feed pressure starts acting on the upper portion of said device, causing the port through which the liquid is supplied by the source to close, and the vent to the atmosphere to open, with the pressure consequently dropping down. This pressure drop is first transmitted to the portion 36 of the network R and, owing to the effect of the pressure difference existing between the network portion 37 (inside which a pressure exists, which is equal to, or approximately equal to, the pressure of the source) and the network portion 36 (inside which a pressure exists, which is equal to, or approximately equal to, the atmospheric pressure), the piston 46, of the valve 39, is pushed upwards inside the seal 47, bringing with itself, in its movement, the shutter 48, which thus opens the seat 52, with the consequent release of the irrigation liquid through the nozzle 45. Such a release of liquid coming from the network portion 37 continues until the pressure inside said portion 37 of the distribution network reaches a value equal to, or close to, the atmospheric value. All the above steps are repeated for the successive downstream portions of the network R, until the last portion of the same network is reached.

The time of opening of the secondary valves is of the order of magnitude of fractions of a second.

The step of refilling of the network R, by the pulsing device D, starts from the time point at which inside the portion 36 of the network the pressure drop down to the atmospheric or nearly atmospheric value occurred.

The network refilling time is longer than the emptying time, and may vary within the range of from a few seconds, up to some tens of seconds, as a function of the size of the irrigation facility, and of the flowrate of the irrigation liquid supplied by the source.

The energy which enables the individual portions of the network to discharge the irrigation liquid, through the pressure drop, is obviously supplied by the elasticity of the network, usually made from a plastic material. In case of a not very elastic network (e.g., a steel network), each network portion can be provided with a suitable elastic storage unit, having a suitable size as a function of the amount of irrigation liquid which one wants to deliver at each cycle.

The particular configuration of the pulsing device D and its particular automatic operating mode, which render it largely independent from the type of downstream-connected distribution network, make it possible the irrigation to be simply and efficaciously regulated as a function of the contingent requirements and of the characteristics of the ground.

Figure 5:
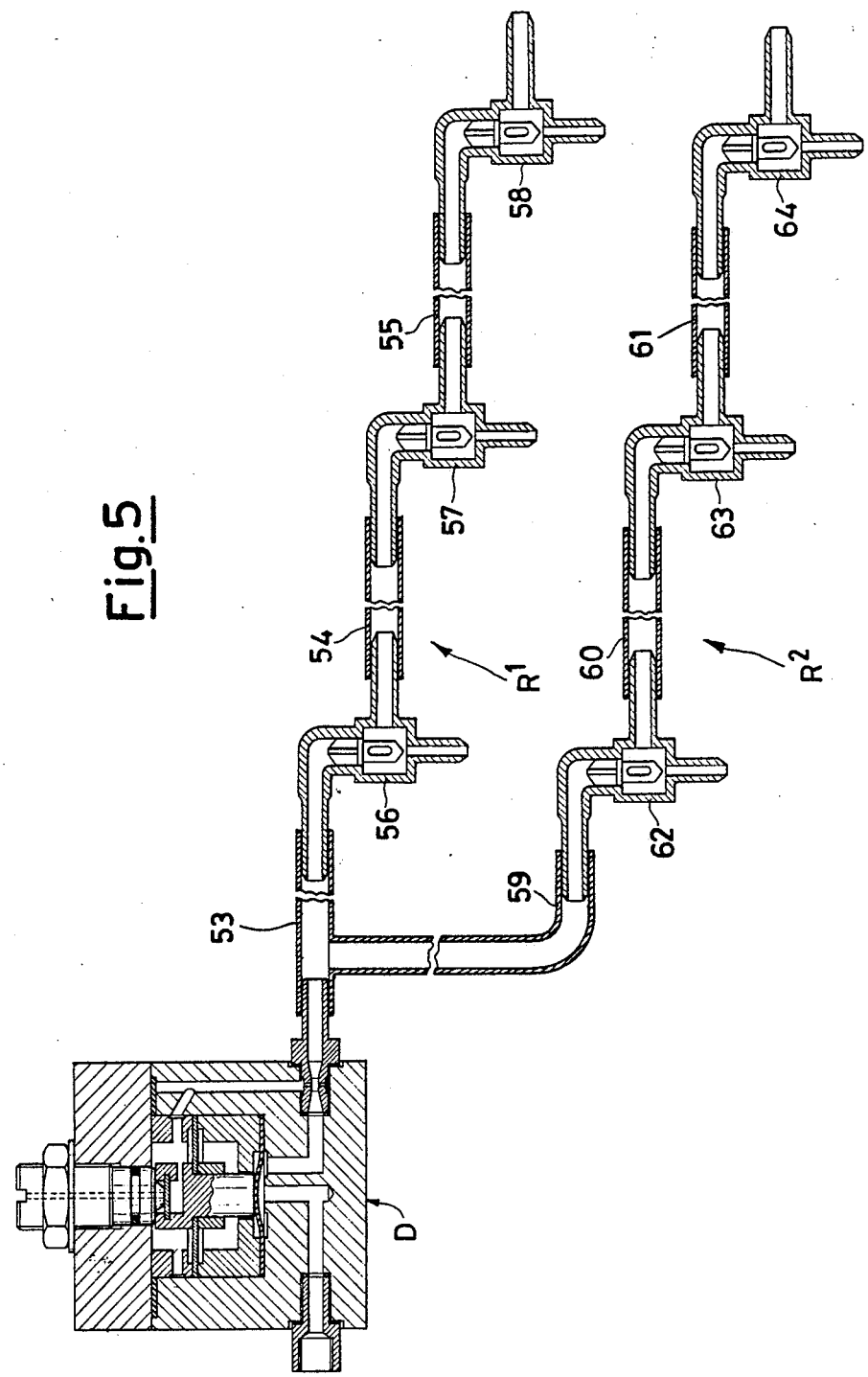
FIG. 5 shows a vertical sectional view of a particular form of embodiment of the irrigation facility.

FIG. 5 shows an example of a branched distribution network. In this case, downstream the pulsing device D, two branches of distribution network and, more particularly, the branch $R^1$, consisting of the branch portions 53, 54 and 55, with the valves 56, 57 and 58 interposed between the same branch portions; and the branch R², consisting of the branch portions 59, 60 and 61, with the respective valves 62, 63 and 64, are branched off.

We claim:

1. A device having an upstream side and a downstream side for automatically delivering a pulse of liquid wherein the upstream side of the device is connected to the liquid source which is under a constant or substantially constant pressure and the downstream side of the device is connected to an open loop distribution system, wherein the device comprises:
   (a) a venturi on the downstream side of the device having a constricted region wherein said venturi receives the liquid;
   (b) a branching duct which branches off from said constricted region for transmitting a depressure generated by said venturi;
   (c) an inlet duct located on the upstream side of the device for feeding the liquid from its source into the device;
   (d) a vent to the atmosphere for decreasing the pressure within the device; and
   (e) a piston-like sliding member reciprocating between a first end position and a second end position wherein said sliding member has a first face responding to the delivery pressure of the liquid and a second face substantially parallel to said first face responding to said depressure generated by said venturi and transmitted by said branching duct, wherein said first end position results in opening said inlet duct and simultaneously closing said vent in response to said depressure generated by an increase in liquid flow through said venturi during charging of the distribution system and said second position results in closing said inlet duct and simultaneously opening said vent to the atmosphere in response to increased pressure generated by a decrease in liquid flow through said venturi transmitted by said branching duct during discharging liquid from the system.

2. A valve having an upper body portion and a lower body portion and an upstream side and a downstream side for automatically delivering a pulse of liquid wherein the upstream side of the valve is connected to the liquid source which is under a constant or substantially constant pressure and the downstream side of the valve is connected to an open loop distribution system, wherein the valve comprises:
   (a) a primary circuit for the liquid in the bottom portion of the valve body including an inlet duct, an outlet duct, a connecting port which can be closed connecting said ducts, and a venturi wherein said venturi is located downstream of said outlet duct;
   (b) a vent to the atmosphere positioned in the upper body portion of the valve;
   (c) a secondary circuit for the liquid in the bottom portion of the valve including an intermediate chamber connecting said vent to said constricting region of said venturi;
   (d) a piston-like sliding member positioned in the lower body portion of the valve reciprocating between an upper position and a lower position wherein when said sliding member is in said upper position said sliding member closes said vent and opens said connecting port of said primary circuit and when said sliding member is in said lower position said sliding member opens said vent and closes said connecting port of said primary circuit.

3. The invention of claims 1 or 2 wherein a first elastic membrane is interposed between said sliding member and said inlet duct.

4. The invention of claims 1 or 2 wherein a second elastic membrane is interposed between said sliding member and said vent.

5. The invention of claims 1 or 2 wherein an annulus membrane is peripherally positioned around said sliding member and said annulus membrane receives said depressure generated by said venturi.

6. An irrigation facility including the device of claim 1 or 2 and wherein the distribution system comprises a plurality of secondary pressure valves which close at a pressure substantially equal to the pressure of the liquid source when the system is charging and which opens when the pressure decreases when the system is decharging.

7. The irrigation facility of claim 6 wherein said secondary valves comprise a valve body which is connected to an inlet pipe, an outlet pipe and a spraying nozzle, wherein said valve body includes:
   (a) a tight sealing disk;
   (b) a piston which slides through said tight sealing disk; and
   (c) a shutter connected to said piston, which comprises two coupled cylindrical members made of flexible plastic material.

* * * * *